United States Patent Office 2,943,864
Patented July 5, 1960

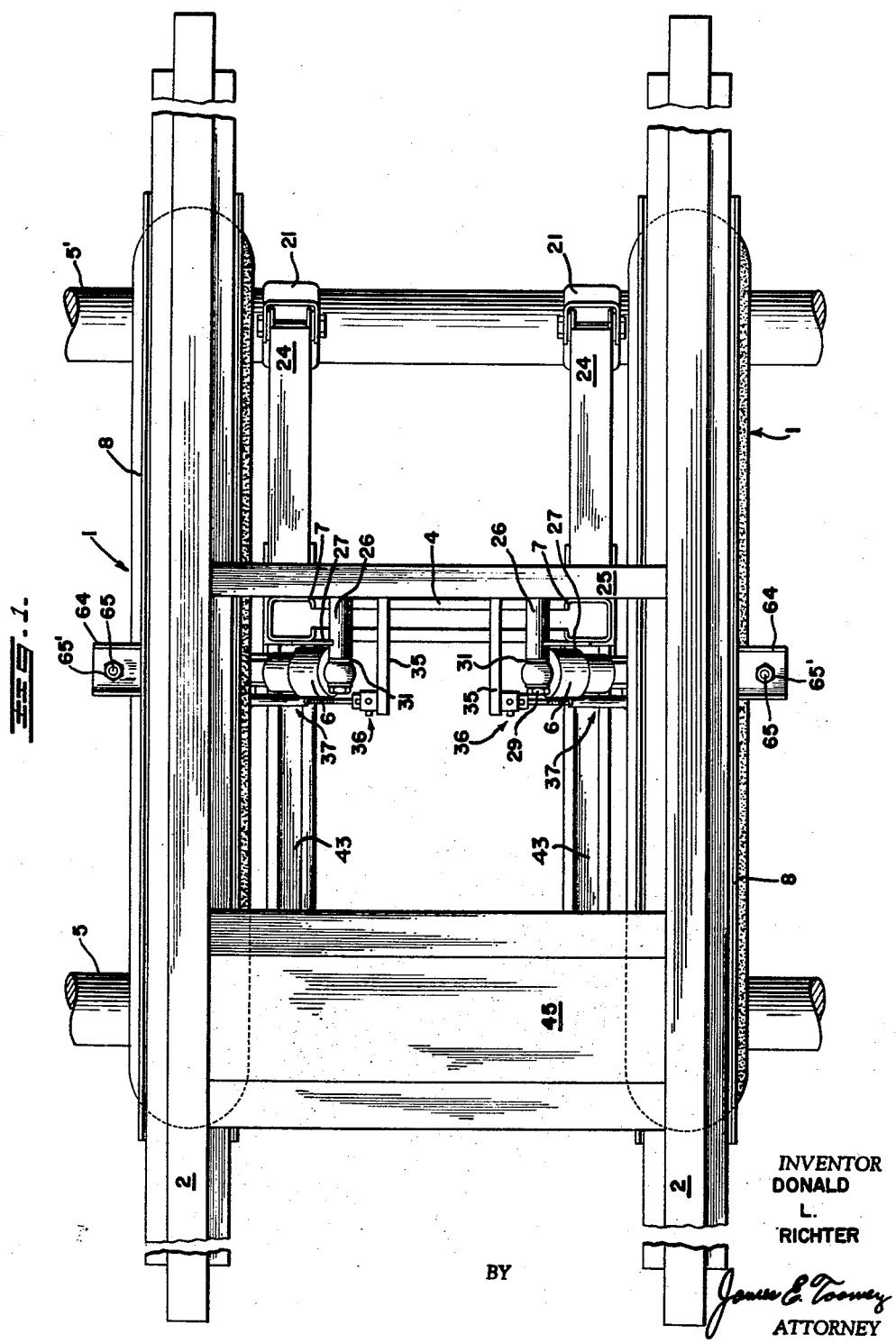

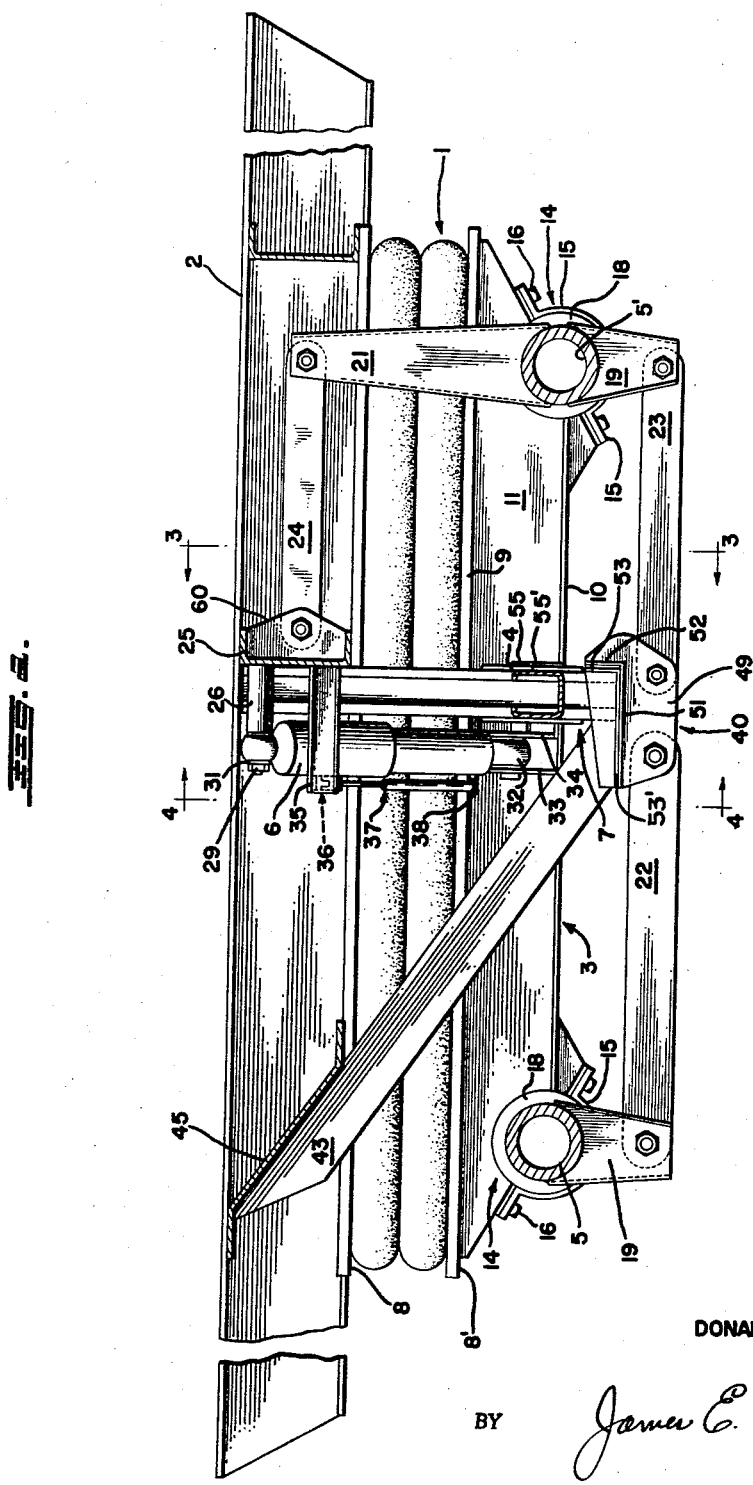

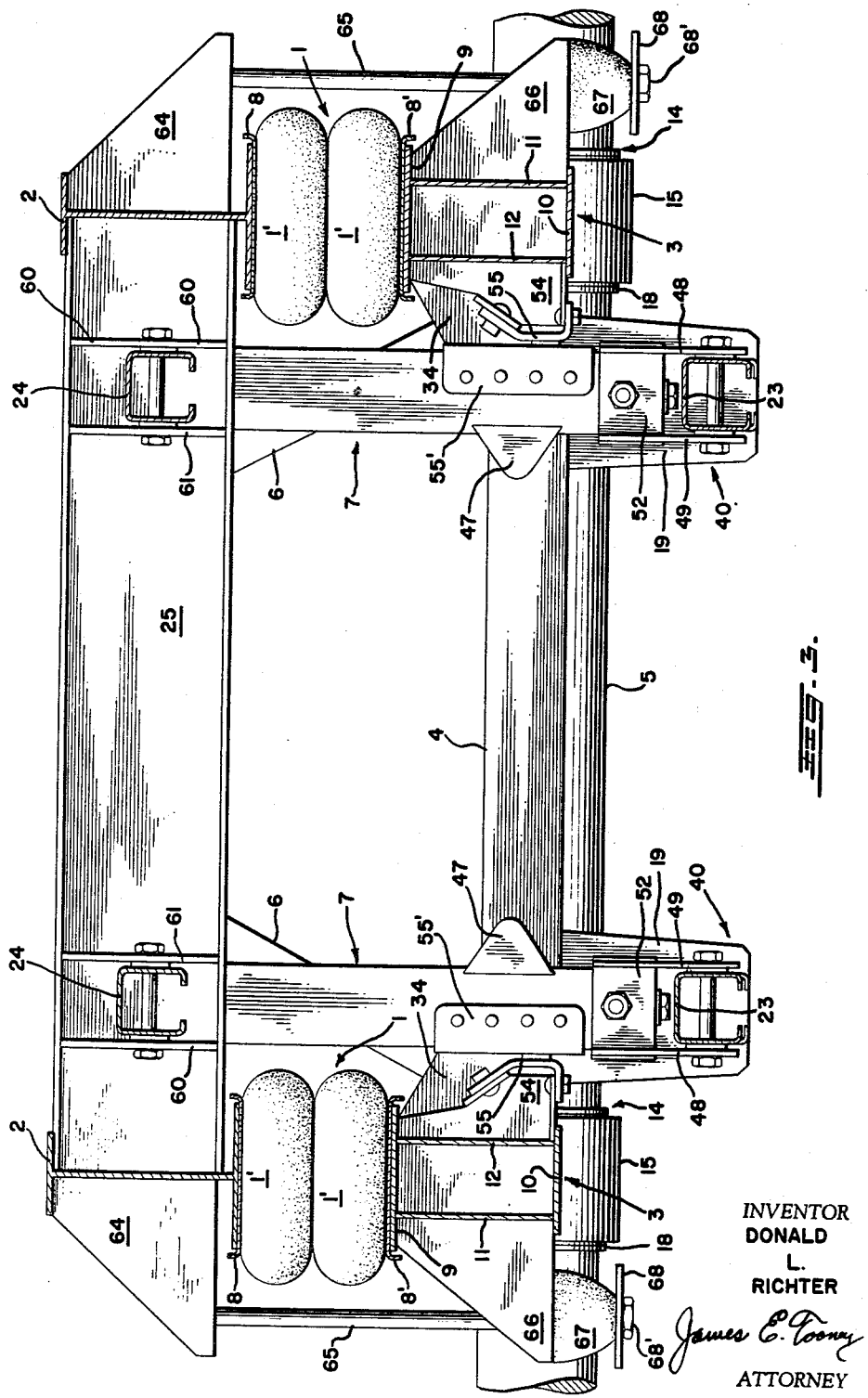

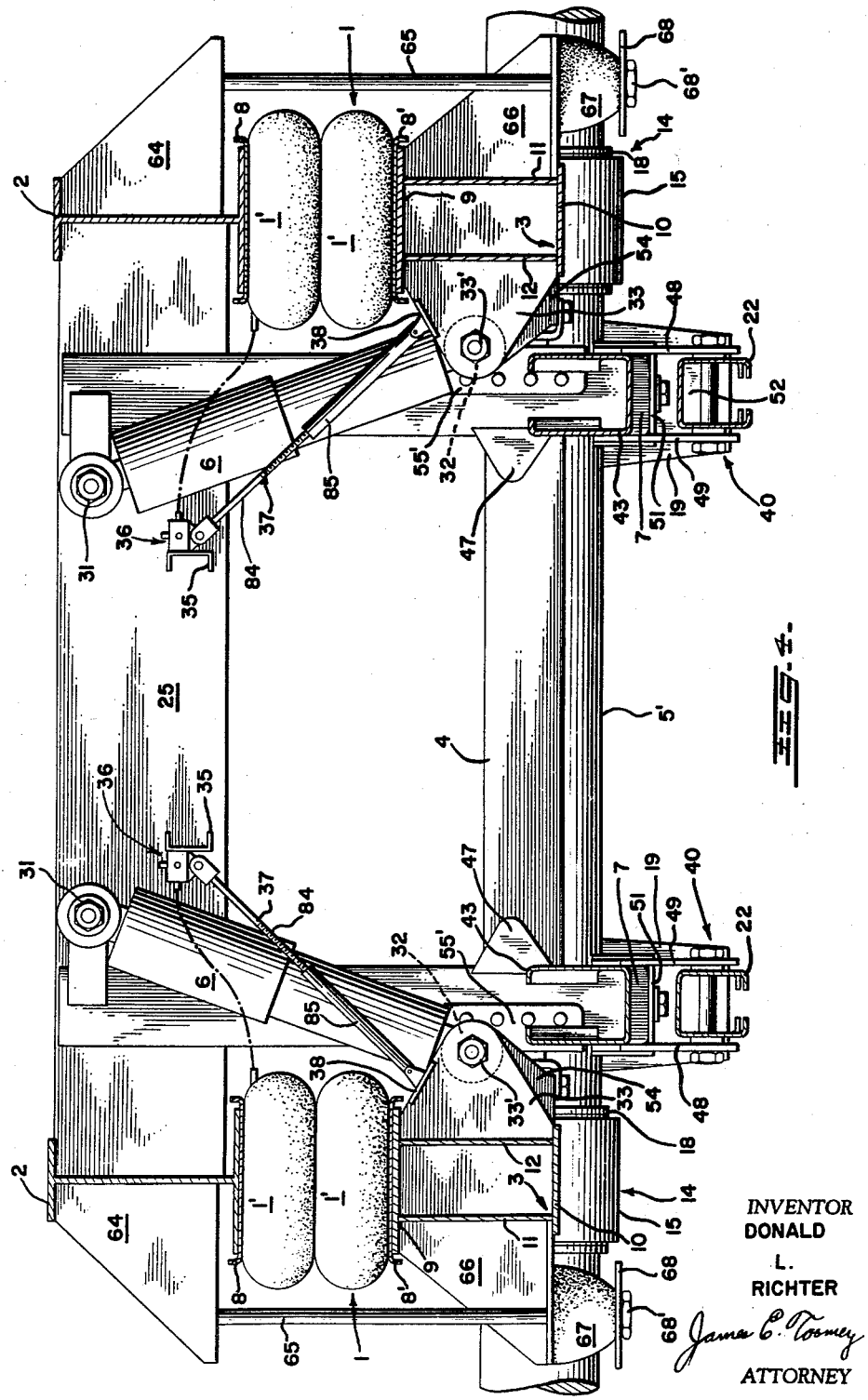

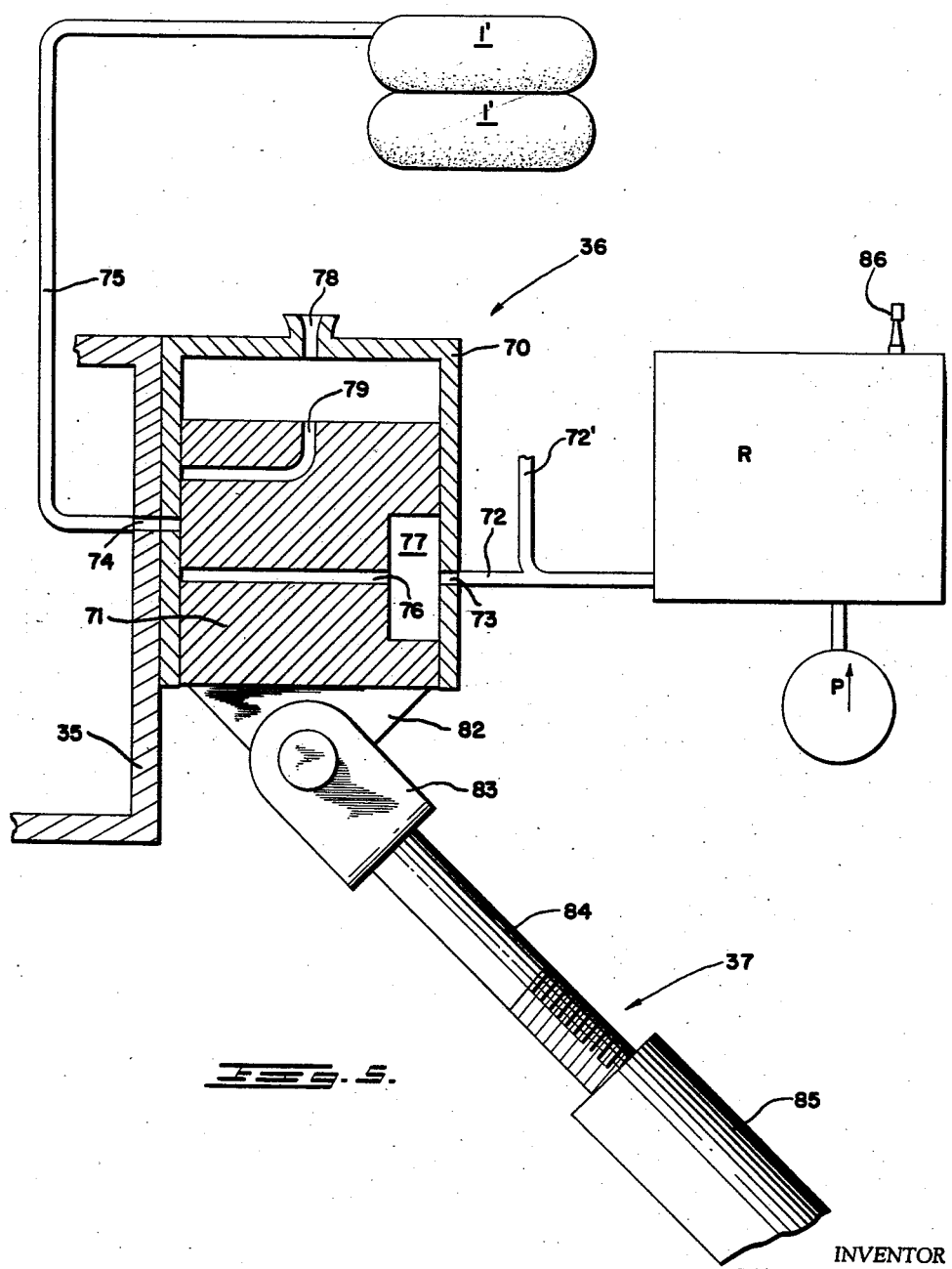

2,943,864

VEHICLE SUSPENSION ASSEMBLY

Donald L. Richter, Oakland, Calif., assignor to Kaiser Aluminum & Chemical Corporation, Oakland, Calif., a corporation of Delaware Filed Aug. 13, 1956, Ser. No. 603,728

14 Claims. (Cl. 280—104.5)

This invention relates to suspension systems for vehicles. In particular, the invention relates to a suspension system of the pneumatic type, wherein the vehicle body or chassis is supported on so-called "air springs" comprised of inflatable bellows. Further, the invention deals with such an "air spring" unit as may be advantageously used in tandem wheel assemblies.

Recent developments in the automotive industry have been directed to the improvement of vehicle suspension systems. Among the many developments has been the use of pneumatically inflatable cushions or bellows in the suspension systems. The present invention is primarily concerned with a system incorporating so-called "air springs" and in particular the type of bellows aforementioned in a unique suspension system, which may be advantageously used with a dual, multiple wheel assembly known as a tandem.

Tandem units are used extensively in conjunction with the usual semi-trailer rigs which haul a considerable amount of the nation's freight and produce over the highways. The use of tandem wheel arrangements is extensive since it is quite obvious that the loads imposed on each wheel are limited by strength; the total capacity depends upon the number of wheels used. In short, the more wheels used, the greater the total capacity.

In view of the fact that most states impose gross load limits as well as load per wheel limitations on heavily loaded vehicles, two results are self-evident. Any increase in the number of wheels increases the ultimate payload which may be legally carried by a given vehicle. Thus, tandem units are considered with favor by the trucking industry because such units provide a greater number of wheels to which the load may be distributed.

On the other hand, such tandem units as have been used before traditionally have many undesirable characteristics. For example, during braking of the vehicle there is a tendency for the rear wheels of the unit to hop or chatter due to the torque reactions generated in the unit. Most of these units are fixed and cannot be adjusted to provide for unequal loading of the vehicle. These tandem units are generally so heavily or over constructed that their increase in weight partially offsets the other advantages. At the same time their riding qualities leave much to be desired, particularly where a vehicle equipped with these tandem units may be traveling empty or with a light load.

Accordingly, the instant system is among other things intended to obviate many of the aforementioned disadvantages. The beneficial results are accomplished by suspending the tandem wheels on each side of the vehicle from longitudinally extending linkage elements which are arranged in conjunction with both a longitudinally extending pneumatic bellows and a lower tank beam connected to the bellows. A suitable limiting and shock absorbing arrangement is also incorporated in the suspension system and the entire system is comprised substantially of light metal components fabricated from a light metal such as aluminum, or the like.

With these facts determined, it may be seen that an object of the invention is to produce a lightweight tandem wheel suspension unit.

Another object of the invention is to produce a suspension system which may incorporate features permitting the maximum use of light metal components, such as aluminum components and the like.

A further object of the invention is to produce a tandem wheel suspension unit incorporating all of the principal advantages of an air spring unit while eliminating a great many of the disadvantages usually ascribed thereto.

Still another object of the invention is to produce a suspension unit which substantially eliminates undesired "wheel hop" during braking of the wheels of the unit.

Another object of the invention is to produce a tandem suspension assembly wherein unequal loading of a vehicle may be readily and automatically compensated for without resorting to redistribution of the load in the vehicle to which the assembly is attached.

A further object of the invention is to produce a suspension system wherein the vehicle road to floor clearance may be adjusted in accordance with the loads being carried.

Still a further object of the invention is to produce a tandem suspension assembly provided with means which will stabilize a vehicle against the ill effects of side loads due to wind, turns and the like.

A still further object of the invention is to produce a suspension system having excellent riding qualities with the accompanying reduction of damage to cargo or the like carried in the vehicle.

These and other objects of the instant development will become more readily apparent when consideration is given to the following detailed description and attached drawings, wherein:

Fig. 1 is a top plan view of the suspension unit incorporating the features of the instant development;

Fig. 2 is a side view of the unit disclosed in Fig. 1 when taken along the approximate center line of the unit;

Fig. 3 is a sectional view taken along the line 3—3 of Fig. 2;

Fig. 4 is a sectional view taken along the line 4—4 of Fig. 2 with the pneumatic bellows expanded fully as by over-inflation or jacking of the vehicle frame; and Fig. 5 is a schematic view with certain parts enlarged of a compensating assembly which may be used in conjunction with the air spring bellows and suspension system disclosed in Figs. 1 thru 4 above.

It will be appreciated, of course, that the instant suspension system may be readily used with vehicles now in existence as well as vehicles incorporating novel construction techinques and light metal components.

Considering for a moment Fig. 2, it may be seen that the suspension bellows 1 is interposed between the vehicle frame 2 and a longitudinally extending bogie beam 3. Conventional means (not shown) or as will be disclosed an automatic system may be used for inflating the bellows 1. This bogie beam 3 is disposed beneath and parallel to the vehicle frame member 2 and carries at its longitudinal extremities spaced parallel axles 5 and 5'.

A suitable shock absorber or dampening unit 6 is interconnected to both bogie beam 3 and the frame 2 in a manner to be described. As thus described the unit can be said to be a substantially conventional arrangement utilizing an air cushion or bellows instead of the usual leaf or coil spring. The departure from such prior arrangements will, however, become readily apparent.

In view of the fact that the arrangement is symmetrical, i.e., identical on each side of the center line of the vehicle it is believed that a detailed description of one side thereof will suffice as a description of the entire unit, since any transverse interconnection will be so indicated.

Accordingly, it may be seen that the inflatable generally longitudinally elongated bellows 1 would be provided with an upwardly facing generally channel shaped saddle member 8 and a downwardly facing lower saddle member 8' both of which are horizontally disposed with the bellow elements 1' sandwiched in between, and adhesively or otherwise permanently secured thereto in a leakproof relationship. These saddles rest on the underside of the vehicle frame member 2 and the top of the bogie beam 3 in such a manner that the flanges of the saddles 8, 8' engage the sides of these elements. The air spring bellows may be directly fixed to the saddle members 8, 8' in such a manner that these elements comprise a readily removable unit, facilitating the replacement or servicing of the bellows in event of leakage or damage.

The bogie assembly may be comprised of a bogie beam 3 having semi-circular axle receiving saddles 14. These saddles are disposed at both the forward and rearward terminal ends of bogie beams 3 and open in a downward direction. A pair of rubber bushings 18 fit within the circular contours of the saddle walls and in turn encircle parallel transverse axles 5 and 5'. A cap member 15 closes each of the axle saddles and in general comprises a semi-circular, diametrically flanged collar which partially surrounds the rubber axle bushing 18 of each of the axles 5 and 5'. Suitable fastening elements such as bolts 16 are passed through the diametrically arranged flanges of each of the caps and into the bogie structure which may include mating flanges against which the flanges on each of the caps 15 may be drawn as the fasteners 16 are tightened.

The bogie beam 3 is of generally box shaped cross sectional configuration and includes parallel upper and lower plate members 9 and 10 and spaced vertical web members 11 and 12. The upper plate 9 lies, as previously described, beneath the downwardly facing channel shaped saddle member 8'.

Thus, as described, side frame members 2 of the vehicle body on both sides are supported on a pair of longitudinally extending bogie members with an air bellows or cushions 1 disposed in sandwiched relation between the bogie beams 3 and the frame members 2. Thus, the axles 5 and 5' may freely move vertically beneath the vehicle and with respect to the frame members 2 and independently of one another. It will be understood that the axles 5 and 5' are in turn cushioned in the rubber bushings 18 and extend transversely across the vehicle beneath the laterally spaced bogie beams 3. By reason of this arrangement, movement of axles 5 and 5' either separately or together in a vertical direction is readily provided for. During these periods of axle movement bellows 1 will be compressed or expanded and the twist from one side to the other will be absorbed in bushing members 18.

In view of the above it is readily apparent therefore that additional means must be provided for dampening the inherent frequency of vertical movements or rebound tendencies which would be set up in the air bellows, and for stabilizing the bogie assembly both longitudinally and laterally. In addition means must be provided for preventing the inducement of torque loads which would tend to lift the rear wheel of the bogie assembly during braking of the wheels.

To accomplish these latter ends there is provided a vertically disposed column assembly 7 which depends from the vehicle frame member 2. This assembly may be fixed to both the frame member 2 as well as to a horizontally disposed transverse channel member 25 which is also fixed at its terminal ends to the frame members 2 and, of course, extends completely across the width of the vehicle. Channel member 25 may also be said to be disposed generally centrally of the suspension assembly.

The vertical column 7 is so positioned that it passes alongside the bogie beam 3 inwardly thereof as seen in Figs. 1 and 3. Thus, a transverse plane passed through the vertical centerline of the two columns 7 and bogie beams 3, of which, as is understood, there are two, one on either side of the vehicle, would bisect the bogie beams slightly rearwardly of the longitudinal midpoint of the bogie beams. The lower end of each of the columns 7 terminates in a bracket assembly 40 which will be described subsequently. A horizontal beam 4 connects the columns 7 together adjacent their bottom extremities.

Considering now one side of the vehicle, it may be seen that secured to the upper end of column 7 is a generally cylindrically shaped bracket 26 having one end reduced in diameter and the opposite end welded or otherwise fixed to the transverse member 25. A suitable gusset plate 27 is welded to the cylindrical bracket and to the column 7 to support the reduced end of bracket 26 as may be seen in Fig. 1. The bracket is arranged such that its axis is parallel to the frame member 2 in both horizontal and vertical planes. The reduced end of bracket 26 is threaded in part and receives a conventional grommet or bushing of rubber or equivalent material which in turn is surrounded by the end of a hydraulic damper or shock absorber 6.

As is conventional, the damper or shock absorber 6 is of the longitudinally telescopic type and each end thereof terminates in generally eye shaped connectors 31 and 32. Thus, connector eye 31 surrounds the bushing on cylindrical bracket 26. Suitable washer and nut means 29 are threaded on bracket 26 and locked thereto so as to hold the connector 31 and the bushing in place.

The lower end 32 of the hydraulic damper or shock absorber 6 is connected in a manner similar to that described above to plates 33 and 34 through a rubber grommet or bushing by means of a bolt 33', which passes between parallel plates 33 and 34. Plates 33 and 34 are secured as by welding or the like to bogie beam 3. These latter mentioned plates extend inwardly toward the center of the vehicle from bogie beam 3 and are, as may be seen from a comparison of Figs. 1, 2 and 3, disposed such that bolt 33' is parallel to, but out of vertical alignment with the cylindrical bracket 26.

Thus, the damper or hydraulic shock absorber 6 extends diagonally downwardly and outwardly from frame member 2 to bogie beam 3. It is readily apparent that a damper mounted on the opposite side of the frame of the vehicle would extend downwardly and outwardly such that if the vehicle were viewed from the rear, the dampers would extend in diverging downward and outward relation with respect to each other.

The damper or hydraulic shock absorber 6 is of the usual telescopic type as has been pointed out above and for this reason it may be readily seen that the distance between connectors 31 and 32 will constantly vary as a result of several factors. These factors will cause compression and expansion of the bellows and may be generally classified as follows; loads carried by the vehicle and expansion and compression caused by movement of the wheels over undulating surfaces, such as bumps, gutters, ruts and so forth.

In an advantageous embodiment, the air spring system, then, would include an automatically compensating valve system which would maintain the height of the vehicle floor above the ground a constant value despite the loaded, partially loaded or unloaded conditions under which the vehicle may be operated. Similarly the system must be so arranged as not to interfere with the normal cushioning and impact absorbing qualities of the suspension unit.

Such a system as may be used to control the individual bellows 1' is shown in Fig. 5 wherein it will be appreciated that while a single system is schematically illustrated, two such systems would be provided, one for each bellows and that both would be operated from a common reservoir R, As may be seen from an inspection of Fig. 5, there may be provided at a convenient location on the vehicle frame, for example in a semi trailer transport, on the tractor frame, a suitable compressed air storage reservoir R. This reservoir could well be the same reservoir as that from which the conventional air brakes are actuated or a separate reservoir if desirable, and is charged by the pump P generally driven from the tractor engine. The reservoir R is provided with an outlet leading to two lines 72, 72' which run to each of the bellows 1 as will be described. The reservoir R is further provided with a suitable valve 86 which permits charging thereof from an external source, thus relieving pump P from extended continuous operation such as would occur were the reservoir R completely exhausted for one or more reasons.

The line 72 is in turn connected to a valve assembly 36 mounted in fixed but preferably removable relation on a suitable bracket 35 in turn fixed to the member 25. This valve includes a valve body 70 of any desired form, preferably cylindrical and is internally bored such that the inner and cylindrical bore is opened at the bottom of the body and is closed at its top. The ports are in turn connected in such a manner that port 73 communicates with reservoir R through pressure line 72, port 74 communicates with bellows 1 through line 75 and port 78 communicates with the atmosphere and thus comprises a vent as will be explained.

It is essential to note that ports 74 and 73 are located in diametrically opposite walls of valve body 70 and are slightly out of alignment vertically with port 74 being slightly closer to the top of the valve body than is port 73.

The valve body receives a cylindrical piston 71 which may move freely vertically in the body. This piston is provided with a diametric bore 76 which terminates at one end in a chamber 77 which is vertically elongated such that regardless of the position of the piston 71 in the valve body 70 the bore 76 will always be in communication with the pressurized line 72 through port 73. The other end of this diametric bore is so positioned that the bore 76 will communicate with the port 74 and thus line 75 and bellows 1 under certain conditions which affect movement of piston 71 in cylinder 70.

The piston 71 also is provided with a right angular bore 79, one end of which communicates with the vent port 78 and the other end of which terminates adjacent but spaced critically from the diametric bore 76. This end of bore 79 is also adapted to communicate with port 74, hence bellows 1 responsive to movement of the piston 71 in valve body 70 due to conditions to be described.

Thus, it may be seen that as the piston 71 moves upwardly and downwardly in the valve body 70 the bellows 1 will be connected to either the vent 78 or to pressure line 72. When, however, the piston is stationary and approximately vertically midway between the top and bottom of the piston, both the vent 78 and pressure line 72 no longer communicate with the bellows 1.

The lower face of the piston 71 is provided with an apertured ear 82. To this ear by any suitable type of removable but lockable bolt or pin is connected the top end of the telescopic rod 37. Rod 37 is insertable within a rod receptacle 85 connected at its lower end to an ear 38 fastened to plates 33. Obviously now the operation of the valves 36 becomes apparent, since the movement between the lower bogie assembly and the vehicle frame would cause movement of the piston 71 in the valve body 70.

Initially the entire system would be pressurized. Since bellows 1 would be deflated, piston 71 would be at the top of valve body 70. Thus, chamber 77, port 76 and the port 74 would be in communication and air would pass from reservoir R to the bellows 1. As the bellows inflates and thus the distance between the bottom bogie assembly and the vehicle frame increases slowly, piston 71 moves downwardly in valve body 70 until the communication between ports 74 and 76 is interrupted at which time the bellows would be inflated to its normal unloaded capacity and pressure.

Thus, as loads are applied to the vehicle this valve 36 would operate as just previously described to permit more air to enter bellows 1 to always maintain the distance from roadway to vehicle floor constant. Because there are two valves 37 and two bellows 1, this system would automatically compensate for eccentric side to side loading of the vehicle.

Considering now removal of the load, it may be seen that the normal tendency of the floor would be to rise with respect to the ground. As this happens, piston 71 moves downwardly relative to valve body 70 and thus vent port 78 and port 79 are in communication with bellows 1. Thus, air is released from the bellows until the piston moves a sufficient distance to close port 74 at which time a condition of normal unloaded inflation of the bellows is once again reached.

The vertical distance between ports 79 and 76 is about twice the diameter of port 74. This permits some compression and expansion of bellows 1, such as caused by bumps or undulations in a road over which the vehicle would move, without causing actuation of the inflating and equalizing system as long as such expansion and contraction of the bellows 1 is within normal limits.

Referring briefly to the rod 37 it may be seen that this rod includes threaded telescopic parts 84 and 85 which permit the proper adjustment of piston 71 within valve body 70 for unloaded conditions of the vehicle.

Referring now to column 7, it may be seen that the lower end of the column terminates in a bracket assembly 40. This bracket assembly may be comprised of a pair of vertically disposed parallel and roughly L-shaped plates 48 and 49 provided with suitable apertures as and for the purpose to be hereinafter described. The plates 48 and 49 are parallel, not only to each other, but also to the frame member 2, and are held in spaced relation by a horizontally disposed plate 51 and a vertically disposed plate 52. Since plate 51 is located below the upper edge of parallel plate members 48 and 49, it may be seen that the upper portions of these plates along with plate 51 define a generally rectangular pocket.

This pocket in turn receives a fabricated generally rectangular foot formed on the lower end of vertical column 7 by plates 53 and 53' corresponding in shape and position to plates 52 and 51 as noted above.

Also received in the pocket defined by plates 48 and 49 is an upwardly and forwardly extending diagonal brace 43 which is welded or otherwise fixed to the bracket assembly 40 at its lower rearward end and welded or otherwise fixed to a generally modified Z-shaped cross frame member 45 as clearly seen in Fig. 2.

The column 7 and diagonal brace 43 are formed of generally box section structural shapes which is open along one side as is clear in Fig. 1. Cross member 4 is a similarly sectioned structural shape. Member 4 is welded between a pair of inwardly directed ear elements 47 secured to column 7 as may be clearly seen in Fig. 3. Member 4 also extends transversely across the vehicle to a similar connection with similar brackets, columns and the like on the opposite side. Thus, there is formed, closely adjacent and alongside of each of the inflatable air bellows and bogie beams 3 an inverted tripod structure, laterally interconnected and of considerable lateral as well as longitudinal rigidity.

The inner face of the column 7 is provided with a channel shaped steel rub member 55'. This member extends, with respect to bogie beam 3, vertically along the column both above and below the normal position of the bogie beam 3. It is made from a fabricated ferrous alloy having exceptional resistance to frictional wear.

A similar long wearing of ferrous alloy 55 is carried by the inwardly extending bracket means 54 on bogie beam 3 and has a vertically disposed face adapted to be engaged by the rub member 55'.

In all normal conditions then it may be seen that little or no lateral movement will occur between the bogie beam 3 and column 7. Such movement as might occur between the vehicle frame 2 and the bogie assembly can be readily dampened by the diagonally disposed hydraulic damper 6. The rub members 55 and 55' are then spaced apart a fraction of an inch such that no contact between these members occurs when the assembly is in a normal position of rest.

Under certain conditions, however, the dampers 6 will not be effective to prevent side sway or lateral movement of the vehicle frame with respect to the bogie assembly. Then as is believed apparent the lateral movement will be limited by reason of the face to face contact of the highly friction resistant ferrous alloy plate 55 and 55'.

Having considered now the arrangement whereby lateral stability of the vehicle is effected, attention will now be directed to the manner in which longitudinal stability and torque reaction is effected.

As may be seen in Fig. 2 each of the tandem axles 5 and 5' is provided with a vertically depending bracket 19 or the like fixed to the axle. In addition, the trailing axle 5' is provided with a vertically disposed upwardly extending bracket 21 which is welded or otherwise fixed to the axle. The brackets are provided with apertures at or adjacent their terminal ends.

Disposed between the lower brackets 19 and bracket assembly 40 on vertically depending column 7 is a pair of longitudinally extending vertically swingable control arms 22 and 23. These are connected by bolts or equivalent fasteners to the axle carried brackets 19 and terminal assembly 40. Each of these arms 22 and 23 is vertically swingable independently of the other.

The bracket or lever 21 which projects upwardly from trailing axle 5' is connected or linked to the transverse frame member 25 by an upper torque or control arm 24 through the medium of bolts or equivalent fasteners. The leading end of this arm is connected to the transverse frame member 25 by means of the rearwardly projecting ears 60 and 61 secured to the frame member.

It will be appreciated from an inspection of the drawings that the distance between column 7 and axle 5' is slightly less than the distance between column 7 and axle 5, and further, that each of the control arms is of generally box shaped cross-sectional configuration as is clearly evident in Fig. 3. Also as is customary in the art, these arms may be provided with removable press fitted and wear resistant bushings at their points of pivotal interconnection as described above.

It will be further appreciated that movement within suitable limits of bogie beam 3 is obtained by reason of the fact that rubber bushings 18 are interposed in the beam axle connections. These bushings will absorb twist during arcuate movement of bogie beam 3 even though a single axle 5 may move in a vertical direction only.

The aforesaid torque arm arrangement serves a dual function. It will be appreciated that longitudinal movement of bogie beam 3 and its related parts is precluded by these arms since any such tendency will be effectively resisted by the arms 22, 23 and 24. Also, since the usual vehicle brakes when actuated set up a torque, which is resisted by the axle and its mounting, it may be seen that these control arms serve as transition members carrying such torque reaction directly to the frame 2 through the column 7.

A further advantageous result obtained from the described arrangement is that "wheel hop" of the trailing wheels carried on axle 5' is eliminated. In explaining this advantage it will be observed that as the torque from bracke actuation is thrown on the axles the entire tandem tends to "nose dive." That is, the entire unit tends to pivot about the tire-road contact point. Thus, ordinarily the vertical load on axle 5 would increase while the vertical load on axle 5' would decrease. As a result, the coefficient of friction of the trailing wheels is reduced and these wheels tend to hop vertically, while at the same time the rear brakes tend to lock causing a rapid vibration and chatter known as "wheel hop."

However, in the instant suspension system the torque arms resist the "nose diving" tendency of the tandem thus maintaining the vertical force component on each axle equal regardless of the brake reactions. Hence, the tendency of the rear wheel to chatter and hop is eliminated.

From the described arrangement then it may be seen that the tandem assembly is stabilized both longitudinally and laterally beneath the vehicle since the tandem axles are arranged in the same manner on both sides of the vehicle and act as a unit because of the transverse tie in as effected by axles 5 and 5'.

It will be seen that due to the vertical freedom permitted between the bogie beam 3 along with its associated parts and the frame member 2, some means must be provided whereby the lowermost position which may be assumed by the bogie assembly is limited. The limiting means must be such that it is ineffective to prevent vertical movement of bogie assembly 3 with respect to vehicle frame 2 during all normal foreseeable operations of the vehicle. However, it may be necessary at times to raise the vehicle body by the application of a jack directly to the frame, as a consequence of which, if unrestrained, the bogie assembly would drop down in such a manner as to damage or distort the air bellows 1.

The mentioned limiting arrangement may be clearly seen in Fig. 4 in limiting position comprised of a bracket or ear 64 which projects outwardly from frame member 2 and is provided with a horizontally disposed portion. A suitable aperture would be provided through the horizontal portion of the bracket or ear 64. A similar bracket or ear 66 having a similar horizontal portion is provided on the bogie beam 3 and extends outwardly in the same direction as that of bracket 64, which is outwardly of the vehicle as viewed in Fig. 3. A suitable aperture is also provided in the bracket or ear 66. This aperture is also in vertical alignment with the aperture provided in the bracket 64. A vertically extending limiting rod 65 is passed through the bracket or ears 64 and also through the bracket or ear 66. The diameter of this rod is substantially smaller than that of the apertures provided in the respective ears 64 and 66 such that the rod is slidable in the apertures and also may be rocked therein to a certain extent.

The top of the limiting rod 65 is provided with an enlarged head on nut 65' which will not pass through the aperture in the ear or bracket member 64. The lower end of the limiting rod 65 is provided with a bushing 67 which is preferably made of a resilient material such as rubber. Bushing 67 surrounds the end of the rod projecting through the aperture provided in the ear 66. The bushing 67 is held in place by a washer 68 backed up by a nut 68' of such a size as to not pass through the opening either in the washer or the bushing 67 and 68. As may be seen in Fig. 3, the size of the bushing is such that it prevents passage of the end of the rod 65 through the aperture provided in the ear or bracket 66.

Thus, it may be seen that during all normal vertical movements of ordinary range of the bogie assembly with respect to the vehicle frame the rod 65 will merely slide with respect to the lower bracket 66. However, should the vehicle by accident or otherwise end up in such a position that overextension of air bellows 1 results, the lowermost movement of the bogie assembly and bogie beam 3 would be limited by reason of the fact that bracket 66 would contact bushing 67 which in turn cushions the shock of contact. This in turn would restrict movement between frame member 2 and bogie beam 3 within safe limits.

It is to be noted that the length of the rod 65 is correlated with the length of the hydraulic damper limiting means 37 in such a manner that both reach the limits of their extension at approximately the same time.

In those instances where it is desirable to raise the vehicle body by the application of a jack to the frame the jack may be applied to the bottom of bracket 64. If no means such as these bracket elements were provided in such cases the bogie assembly since it is relatively unstrained, would ordinarily drop down in such a manner as to damage or distort the bellows. The various brackets and rods in turn operate to restrict movement between the frame 2 and bogie beam 3 within safe limits during jacking.

Referring briefly to the pneumatic bellows or air spring it may be observed that means, such as a valve or the like, are provided in a suitable accessible place whereby the pneumatic pressure may be varied at will to accommodate the loading conditions of the vehicle, or if desired, an automatic system may be provided which is sensitive to the conditions in each bellows to regulate the pressure therein.

The entire unit is also readily adaptable to fabrication from light metal components and represents, as such, a substantial reduction in weight over either a conventional leaf spring tandem or the relatively newer "air spring" suspension systems now being offered to the trade.

While certain specific details have been disclosed, it will be appreciated that the spirit and scope of the invention is limited only to the extent as defined in the following claims.

What is claimed is:

1. An axle suspension assembly for vehicles including spaced frame members comprising the combination of elongated and longitudinally extending pneumatic bellow means, bogie beams extending beneath said bellow means, said bellow means also being interposed between said frame members and said bogie beams, axles carried in tandem relation by said bogie beams, wheels carried by said axles, stabilizing means for said bogie beams and said axles beneath said frame members, said stabilizing means including common linkage elements for resisting both longitudinal movement and torque reactions in said bogie beams during braking of said wheels, certain of said linkage elements comprising vertically disposed levers, column means including a diagonally disposed brace forming a tripod structure connected to said linkage elements, said column means also being rigidly fixed to said frame members and acting to connect said linkage elements to said frame members, and hydraulic damper units for resisting lateral movement of said bogie beams relative to said frame members.

2. In a tandem axle suspension assembly for vehicles including a frame member, a bogie beam, bellow means interposed between said frame member and said bogie beam, axles carried by said bogie beam in tandem relation, wheels carried by said axles, the improvement comprising means for stabilizing said bogie beam and said axles beneath said frame member, said stabilizing means including common linkage elements for resisting longitudinal movement and torque reactions in said bogie beam during braking of said wheels, certain of said linkage elements comprising vertically disposed levers, column means including a diagonal brace forming a forwardly disposed tripod structure connected to said linkage elements and rigidly fixed to said frame member, said column means also serving to connect said linkage elements to said frame member, and means including a hydraulic damper unit for resisting lateral movement of said bogie beam relative to said frame member.

3. In a tandem axle suspension assembly for vehicles as described in claim 2, means for automatically compensating for vehicular loads imposed on said tandem.

4. In a tandem axle suspension assembly for vehicles including spaced frame members, the combination of a pair of elongated longitudinally extending pneumatic bellows, bogie beams extending beneath said bellows, said bellows also being interposed between said frame members and said bogie beams, axles carried by said bogie means in tandem relation, wheels rotatably mounted on the ends of said axles, means for stabilizing said bogie beams and said axles beneath said frame members, said stabilizing means comprising vertically disposed support means carried by and rigidly fixed to said frame members, said support means including columns and longitudinally extending diagonal braces disposed to one side of and closely adjacent the respective bogie beams on either side of said vehicle frame members, linkage means connected to said support means and to said axles, for stabilizing said bogie beams and said axles in longitudinally fixed relation beneath said frame members, and said linkage means also including vertically disposed lever members.

5. The combination as set forth in claim 4, including means associated with said bogie beams for engaging a jack element during jacking of said assembly as when repairs are made thereto.

6. In a tandem axle suspension assembly for vehicles including spaced frame members, the combination of a pair of elongated longitudinally extending pneumatic bellows, bogie beams extending beneath said bellows, said bellows also being interposed between said frame members and said bogie beams, axles carried by said bogie means in tandem relation, wheels rotatably mounted on the ends of said axles, means for stabilizing said bogie beams and said axles beneath said frame members, said means comprising vertically fixed support means carried by said frame members, said support means forming a rigid tripod structure and including rigidly interconnected columns and longitudinally extending diagonal braces disposed to one side of and closely adjacent the respective bogie beams on either side of said vehicle frame members, linkage means connected to said support means and to said axles, for stabilizing said bogie beams and said axles in longitudinally fixed relation beneath said frame members including means for automatically compensating the degree of expansion of said bellows in accordance with the load imposed thereon, said linkage means also including vertically disposed lever members.

7. A tandem axle suspension assembly for vehicles of the type described comprising the combination of a horizontally disposed frame member, a pneumatic bellows, a bogie beam extending beneath said frame member and said bellows, said bellows also being interposed between said frame member and said bogie beam to permit normal vertical movement of said bogie beam relative to said frame member, axles carried by said bogie beam in tandem relation, wheels rotatably mounted on said axles, means for stabilizing said bogie beam and said axles beneath said frame member, said stabilizing means comprising column means including a diagonal brace forming a tripod structure rigidly fixed to said frame member, common linkage elements connected to said column means and extending in swingable relation between said axles and said frame member for resisting longitudinal movement of said bogie beam and the torque reaction during braking of said wheels, said stabilizing means further including a damper element for resisting lateral movement of said bogie beam relative to said frame member, and certain of said linkage elements including vertically disposed levers.

8. The combination as set forth in claim 7, including means associated with said bogie beams for engaging a jack element during jacking of said assembly as when repairs are made thereto.

9. In a tandem axle suspension assembly for vehicles including spaced frame members, the combination of bogie beams extending beneath the said frame members, a pair of elongated longitudinally disposed pneumatic bellows interposed between and secured to said frame members and said bogie beams, means connecting a plurality of tandem axles to the opposite ends of said bogie beams, said connecting means including flexible bushings interposed between the axles and said bogie beams, linkage means including vertically disposed levers interposed between and connecting the axles with the said frame members, said linkage means acting to prevent longitudintal movement of said bogie beams relative to said frame members, said linkage means further acting to resist torque reactions imposed in said bogie beams during the braking of wheels secured to said axles, means for resisting lateral movement of said bogie beams, and said linkage means further comprising column means including a diagonal brace forming a rigid tripod structure portions of which are rigidly secured to said frame members.

10. The combination as set forth in claim 9, including means associated with the bogie beams for engaging a jack element during jacking of said assembly as when repairs are made thereto.

11. In a tandem axle suspension assembly for vehicles having spaced frame members, bogie beams extending beneath said frame members and in longitudinal alignment therewith, a pair of elongated longitudinally extending pneumatic bellows interposed between and connected to said frame members and said bogie beams, axles carried by said bogie beams in tandem relation, and wheels rotatably journaled on the ends of said axles, the improvement comprising means for stabilizing said bogie beams and said axles beneath said frame, said means comprising a plurality of longitudinally extending links and vertically disposed levers connected to said axles, vertical tripod type supports depending from and rigidly secured to and said frame members, means interconnecting said links and said vertical supports, said links acting to resist longitudinal movement as well as torque reaction loads induced in said bogie beams during braking of said wheels, said vertical supports further including diagonally disposed braces and wear resistant surfaces, cooperating wear resistant surfaces positioned on said bogie beams and adapted to engage said first mentioned surfaces to prevent lateral movement of said tandem suspension assembly relative to said frame, and diagonally diverging hydraulic damper means interposed between and connected to said frame members and said bogie beams, said damper means also acting in conjunction with said wear resistant surfaces to prevent lateral movement of said tandem suspension assembly relative to said frame members.

12. A pneumatic suspension assembly for tandem wheeled assemblies comprising a frame, a pair of elongated bellows disposed in parallel relation beneath the vehicle frame, a tandem bogie beam disposed beneath each of said bellows and in longitudinal alignment therewith, axles carried in parallel transverse relation with respect to and at the forward and rearward ends of said beams, means including resilient bushings fixing said axles to said beams for limited relative movement with respect thereto, diagonally disposed hydraulic dampers connected between said vehicle frame and said bogie beams, linkage means including vertically disposed levers swingably connected to each of said axles and said vehicle frame, tripod support means including vertical columns and diagonally disposed longitudinally extending braces rigidly fixed to said frame and to each other laterally of the vehicle for connecting said linkage means to said frame, wear resistant means carried on said columns, similar means carried by said bogie beams, said wear resistant means acting when in slidably contacting relation to stabilize said assembly laterally of said frame, and said linkage means and tripod support means acting to stabilize said axles, said wheels and said beams longitudinally of the vehicle and to prevent vehicle movement of the rearmost of said axles during braking of the vehicle.

13. A pneumatic suspension assembly for tandem wheeled assemblies comprising a frame, a pair of elongated bellows disposed in parallel relation beneath the vehicle frame, a tandem bogie beam disposed beneath each of said bellows in longitudinal alignment therewith, axles carried in parallel transverse relation with respect to and at the forward and rearward ends of said beams, means including resilient bushings fixing said axles to said beams for limited relative movement with respect thereto, diagonally disposed hydraulic dampers connected between said vehicle frame and said bogie beams, linkage means swingably connected to each of said axles and said vehicle frame, means including vertical columns rigidly fixed to said frame and to each other laterally of the vehicle for connecting said linkage means to said frame, wear resistant means carried on said columns, similar means carried by said bogie beams, said wear resistant means acting when in slidably contacting relation to stabilize said assembly laterally of said frame and said linkage means acting to stabilize said axles, said wheels and said beams longitudinally of the vehicle and to prevent vertical movement of the rearmost said axles during braking of the vehicle and said linkage means comprising a single pair of parallel links connected to the lowermost portion of said vertical columns and to the foremost axle of said parallel tandem axles and vertically spaced pairs of parallel links connected to said trailing axle of said pair of axles, the lowermost pair of links in said last-mentioned pair of links being connected to said columns and the uppermost pair of links being connected to said frame.

14. A pneumatic suspension assembly for tandem wheeled assemblies comprising a frame, a pair of elongated bellows disposed in parallel relation beneath the vehicle frame, a tandem bogie beam disposed beneath each of said bellows in a longitudinal alignment therewith, axles carried in parallel transverse relation with respect to the forward and rearward ends of said beams, means including resilient bushings fixing said axles to said beams for limited relative movement with respect thereto, diagonally disposed hydraulic dampers connected between said vehicle frame and said bogie beams, linkage means swingably connected to each of said axles and said vehicle frame, means including vertical columns rigidly fixed to said frame and to each other laterally of the vehicle for connecting said linkage means to said frame, wear resistant means carried on said columns, similar means carried by said bogie beams, said wear resistant means acting when in slidably contacting relation to stabilize said assembly laterally of said frame, and said linkage means acting to stabilize the axles, said wheels and said beams longitudinally of the vehicle and to prevent vertical movement of the rearmost of said axles during braking of the vehicle and said linkage means comprising a single pair of parallel links connected to the lowermost portion of said vertical columns and to the foremost axle of said parallel tandem axles and vertically spaced pairs of parallel links connected to said trailing axle of said pair of axles, the lowermost pair of links in said last-mentioned pair of links being connected to said columns, the uppermost pair of links being connected to said frame, said links including anti-friction bushing means interposed at their connections to said axle, to said frame and to said columns whereby said links may pivot vertically freely upon the movement of said axles with respect to said frame and to the said columns.

References Cited in the file of this patent

UNITED STATES PATENTS

| | | |
|---|---|---|
| 2,096,530 | Alden | Oct. 19, 1937 |
| 2,705,152 | Walter | Mar. 29, 1955 |
| 2,742,301 | Pointer | Apr. 17, 1956 |
| 2,750,200 | Scheel | June 12, 1956 |
| 2,756,048 | Pfeiffer | July 24, 1956 |
| 2,771,303 | Frazier | Nov. 20, 1956 |
| 2,821,407 | Brumbaugh | Jan. 28, 1958 |

UNITED STATES PATENT OFFICE

CERTIFICATE OF CORRECTION

Patent No. 2,943,864                                                  July 5, 1960

Donald L. Richter

It is hereby certified that error appears in the printed specification of the above numbered patent requiring correction and that the said Letters Patent should read as corrected below.

Column 6, line 71, for "wearing of" read -- wearing element of --; column 7, line 70, for "bracke" read -- brake --.

Signed and sealed this 29th day of November 1960.

(SEAL)
Attest:

KARL H. AXLINE
Attesting Officer

ROBERT C. WATSON
Commissioner of Patents